United States Patent [19]

Greivenkamp, Jr.

[11] Patent Number: 4,794,550
[45] Date of Patent: Dec. 27, 1988

[54] EXTENDED-RANGE MOIRE CONTOURING

[75] Inventor: John E. Greivenkamp, Jr., Rochester, N.Y.

[73] Assignee: Eastman Kodak Company, Rochester, N.Y.

[21] Appl. No.: 918,950

[22] Filed: Oct. 15, 1986

[51] Int. Cl.[4] .............................................. G01B 11/02
[52] U.S. Cl. .................... 364/562; 364/525; 364/563; 356/357; 250/550
[58] Field of Search ............... 364/560, 562, 563, 525; 250/550, 237 G; 356/354, 355, 357, 360

[56] References Cited

U.S. PATENT DOCUMENTS

| | | | |
|---|---|---|---|
| 3,943,278 | 3/1976 | Ramsey, Jr. ........................ | 178/6.8 |
| 4,111,557 | 9/1978 | Rottenkolber et al. ............ | 356/168 |
| 4,155,098 | 5/1979 | Roach et al. ....................... | 250/550 |
| 4,169,980 | 10/1979 | Zanoni ............................... | 364/560 |
| 4,212,073 | 7/1980 | Balasubramanian ............... | 364/562 |
| 4,498,770 | 2/1985 | Corwin et al. ..................... | 356/349 |
| 4,564,295 | 1/1986 | Halioua ............................. | 250/237 G |
| 4,697,927 | 10/1987 | Ono .................................. | 356/360 |

OTHER PUBLICATIONS

"Moire Topography, Sampling Theory, and Charge-Coupled Devices", by B. W. Bell and C. L. Koliopoulos, *Optics letters*, vol. 9, p. 171, May 1974.

Primary Examiner—Parshotam S. Lall
Assistant Examiner—Brian M. Mattson
Attorney, Agent, or Firm—Thomas H. Close

[57] ABSTRACT

The measurement range of Moire contouring techniques is extended beyond the Nyquist frequency limit by constraining the reconstruction of a surface contour according to a priori knowledge about the surface. In one example the a priori knowledge is that the surface is smooth, being described by a function having continuous derivatives, and the location of a region where the surface changes by less than C/2 per sample. In another example, the a priori knowledge is the location and height of a step discontinuity to within C/2, where C is the contour interval.

20 Claims, 16 Drawing Sheets

EXTENDED-RANGE MOIRE CONTOURING

TECHNICAL FIELD

This invention relates to the field of surface contour measurement, and more particularly to Moire contouring techniques.

BACKGROUND ART

Three-dimensional surface contouring using Moire techniques is well known (see for example U.S. Pat. No. 4,212,073 issued July 8, 1980 to Balasubramanian). There are two basic implementations of this technique: Moire topography and Moire deflectometry. Moire topography is used to measure surfaces that are diffuse reflectors. Moire deflectometry is used with surfaces that are specular reflectors. The type of data that is collected with either of these techniques is similar and requires similar processing.

An example of a system used for Moire topography is shown in FIG. 1. Parallel equispaced lines of light or fringes 10 having a period d are formed for example by projecting the image of a grating 18 onto a surface 12 to be measured. The scattered intensity is viewed at an angle $\theta$ from the direction of the fringe projection by a lens 14 and camera 16 having an image sensor 17. If the surface 12 is not flat, a curved fringe pattern is seen, and the curvature is related to the surface profile. The intensity pattern on the surface is given by:

$$i(x,y) = i'(x,y) + i''(x,y) \cos[(2\pi/d)(x + h(x,y) \tan \theta)], \quad (1)$$

where $i'(x,y)$ and $i''(x,y)$ are constants relating to the DC bias and AC modulation of the viewed fringes, d is the period of the projected fringes on the surface, $h(x,y)$ is the surface height profile, and the fringes are projected parallel to the y-axis. Only the fundamental frequency component of the projected grating 18 is given by this equation—if the original grating is a square-wave target, for example a Ronchi ruling, higher frequency terms will appear in equation (1). The information about the surface height in the viewed fringe pattern is encoded in the spacing of the fringes. The surface height difference needed to increase or decrease the period of the viewed fringes by the base fringe period d is known as the contour interval C, where $$C = d/\tan \theta. \quad (2)$$

There are at least two method for producing the projected fringes. The first is an optical projector as shown in FIG. 1. The grating transparency 18 is illuminated by a light source 20 and is imaged onto the surface 12 by the lens 22. To eliminate magnification errors with depth of field, a telecentric lens system is often used. However, projectors which produce diverging fringe patterns are also used, and the analysis is more complicated. In that event, the contour interval C is not a constant and changes as a function of height and position. Parallel, equispaced fringes are assumed for this analysis. The second method for projecting fringes is to use an interferometer as shown in FIG. 2. The interferometer is in a Twyman-Green configuration. A beam of collimated laser light 26 is split into the two arms of the interferometer by the beamsplitter 28, and parallel equispaced fringes 30 are produced by interference when the two beams are recombined. The period of the fringes can be changed by tilting one of the two mirrors 32.

The fringe pattern is sampled by the image sensor 17, and the sampled values are supplied to a computer 33. The computer 33 processes the samples, and displays the processed samples on a display, such as a CRT 35. A standard keyboard 37 is employed to input information into the computer to control the Moire contouring apparatus.

The other implementation of Moire contouring is Moire deflectometry. An example of such a system is shown in FIG. 3. As diagramed, a collimated input beam 38 is reflected off a specularly reflecting surface 40 at an angle $\alpha$. The reflected beam passes through a grating 42 (having a pitch d) and impinges on a detector 44 that is a distance A from the grating. A surface deformation 46 having a slope of $\beta$ will deflect the reflected beam through an angle of $2\beta$. A distorted shadow of the grating 42 falls on the detector 44. The displacement of the fringe at a given location will be a function of the local deviation angle $\beta$, and the displacement equals $2\beta A$. In this situation, the contour interval $C_D$ occurs when this displacement is equal to the grating period d:

$$C_D = d/2A. \quad (3)$$

Note that the contour interval is an angle, not a distance. In addition to the differences in the surface reflectivities, this condition marks the major difference between Moire topography and deflectometry. Moire deflectometry measures the slope of the surface perpendicular to the grating lines, while Moire topography gives the surface height distribution.

Without loss of generality, the majority of the remainder of the discussion will center on the application of Moire topography. It should be clear, however, that the principles described here are equally applicable to Moire deflectometry.

There are several schemes available for detecting and measuring the curvature of the viewed fringe pattern. One scheme involves viewing the pattern through a second grating, identical to the projection grating, that is located in the focal plane of the camera 16. A Moire or product of the distorted test pattern and the reference pattern is formed, hence the name Moire topography. When the grids are chosen to be identical, a flat object will produce a zero-frequency beat or difference frequency. The resulting Moire pattern will have no fringes in it after the high spatial frequencies corresponding to the individual gratings are filtered out. When the surface is not flat, low frequency Moire fringes, corresponding to the difference between the reference and test patterns, will appear in the filtered output. The Moire pattern is sampled, and the fringe centers are located. The surface profile can then be constructed by using the fact that adjacent Moire fringes indicate a change of the surface height of one contour interval C.

An often more convenient method of sampling the Moire pattern is to image the distorted test pattern directly onto a solid-state detector array. The spacing of the pixels themselves in the array will serve as the reference grid, and the phenomenon of aliasing will result in the low frequency Moire pattern, which is the product of the reference grating (i.e. the sensing array) and the deformed projected grating pattern. To simplify the analysis, all dimensions will be discussed as they appear in the sensor plane. For example, scale factors relating to the magnifications of the imaging systems will be ignored.

For the purpose of modeling the system, the sensor geometry diagramed in FIG. 4 is assumed. A rectangular array of rectangular pixels 48 is used, and the pixels have dimensions and spacings of a by b and $x_s$ by $y_s$ respectively. The sampled image $i_s(x,y)$ produced by the sensor is $$i_s(x,y) = [i(x,y) ** \text{rect}(x/a, y/b)] \text{comb}(x/x_s, y/y_s), \quad (4)$$

where $i(x,y)$ is the viewed fringe pattern as described by equation (1), ** indicates a two-dimensional convolution, and the comb function is an array of delta functions with spacing of $x_s$ by $y_s$. The frequency space representation of the sampled pattern is obtained by taking a Fourier transform:

$$I_s(\xi,\eta) = [I(\xi,\eta) \text{sinc}(a\xi, b\eta)] ** \text{comb}(x_s\xi, y_s\eta), \quad (5)$$

where $\xi$ and $\eta$ are the spatial frequency coordinates, $I(\xi,\eta)$ is the spectrum of the intensity pattern, and $$\text{sinc}(a\xi, b\eta) = \frac{\sin(\pi a\xi)}{\pi a\xi} \cdot \frac{\sin(\pi b\eta)}{\pi b\eta}. \quad (6)$$

The active area of the pixel, represented by the rect and sinc functions in equations (4) and (5), serves to reduce the contrast of the recorded fringe pattern. The intensity pattern is averaged over the pixel, and the contrast of a fringe at a particular spatial frequency or spacing is reduced by the corresponding value of the sinc function.

The nature of the previously mentioned aliasing and the limitations in measurement range of the conventional Moire techniques can be observed by plotting equation (5) in one dimension for two different types of viewed patterns. The product $I(\xi)\text{sinc}(a\xi)$, which is the input scene, is shown in FIG. 5a. A sinusoidal fringe pattern is assumed, and this product contains three portions—the DC bias at zero frequency 50 and two lobes 52 centered around the frequencies $\pm 1/d$. These lobes contain the information about the curvature and spacing of the fringe pattern. Since a pattern of frequency $1/d$ is projected, one would expect the spectral content of the viewed pattern to be centered at these frequencies. The maximum width of these lobes is denoted W, and it is not necessary that W be centered on the frequency $1/d$.

Before proceeding, it is useful to define a few terms. The Nyquist frequency $f_N$ of a sensor is defined to be half the sampling frequency of the sensor, or $\frac{1}{2}x_s$. This frequency is generally considered to be the limiting resolution of a sampled imaging system. The baseband of the sensor is the frequency range near the origin between $\pm f_N$. A Moire interval has been defined for this application as a frequency band of width $f_N$ that begins (and ends) at a multiple of the Nyquist frequency.

The first object to consider is one which is close to being flat. In this case, the width W is less than $f_N$, and the proper choice of d will place the sidelobe of the viewed pattern in the second Moire interval, at frequencies between $f_N$ and $1/x_s$. The sampling operation replicates this spectrum at the multiples of the sampling frequency (equation (5)), and this situation is shown in FIG. 5b. All of the replicated lobes are well separated, and the first-order replicas 54 of the lobes have been mapped into the baseband of the sensor. The initial frequencies 56 in the viewed pattern, centered at $1/d$, are beyond the Nyquist frequency of the sensor, and have been aliased to lower spatial frequencies. This effect subtracts the reference grid, the sensor sampling pattern, from the viewed fringe pattern. Note that a viewed fringe occurring at the same frequency as the samples is mapped back to zero frequency—the same result as when viewing the pattern through a reference grating. Since the orders are separated, the sampled spectrum can be easily low-pass filtered to yield only the desired information in the sensor baseband, the Moire fringes.

When the object is more steeply curved than that represented in FIG. 5b, the range of frequencies observed in the viewed intensity pattern will be greater, and W will increase. If W is greater than the Nyquist frequency, the sidelobe will no longer fit into a Nyquist interval, and the resultant spectrum of the sampled image is given in FIG. 5c. The lobes overlap and can no longer be separated. A measured fringe frequency in the baseband cannot be identified as having originated in just the first order side lobe 58 as required for the Moire analysis. It may also be present in the baseband as a result of the overlap of the other replicas 60. Prior art methods of Moire analysis have not been able to resolve this dilemma, and have failed to properly reconstruct objects of this type.

The maximum measurement range of conventional Moire topography can be calculated from the foregoing analysis. The maximum frequency difference in the viewed fringes must be less than the Nyquist frequency—this frequency range must fit into the baseband of the sensor. The maximum period of a Moire fringe must therefore be twice the sample pitch of the sensor or a half fringe per sample. Since a contour interval corresponds to a full fringe, the maximum surface change that is allowed by this analysis is a half of a contour interval per sample (C/2 per sample). This constraint limits the maximum slope of the surface that is being measured and indirectly limits the maximum excursion.

A method to obtain the relative phase of the fringe pattern at each sample is to use synchronous detection or phase-shifting techniques as disclosed in the referenced U.S. Pat. No. 4,212,073. According to this method, an arbitrary phase shift is inserted between the reference grid (the sensor) and the viewed intensity pattern by laterally shifting either the projection grating or the sensor. Mechanisms for obtaining this phase shift are easy to implement. In FIG. 1, the projection grating 18 can be translated by a transducer 24 in the direction of arrow B to obtain the shift. The interferometrically produced pattern in FIG. 2 can be phase shifted by translating either of the mirrors 32 in a direction perpendicular to its surface. A piezoelectric translater 34 is used for this purpose to move one of the mirrors in the direction of arrow C. These shifts can be computer controlled, with a time-varying intensity pattern being produced.

A general expression for the intensity pattern that is viewed by the detector 17 for a particularly phase shift $\delta_n$ is $$i_n(x,y) = i'(x,y) + i''(x,y) \cos[(2\pi/d)(x + h(x,y) \tan \theta - \delta_n)], \quad (7)$$

where n indexes the phase shift, and the other terms are as described in equation (1). The data set needed for the analysis of the surface height using phase-shifting techniques is a set of three or more patterns produced with different phase shifts $\delta_n$. A simple phase-shift algorithm to implement is the four-step method, where the phase is advanced in four equal steps of 90°. In this case, $$\delta_n = 0, d/4, d/2, 3d/4. \tag{8}$$

The four recorded intensity patterns after trigonometric simplification are $$i_1(x,y) = i'(x,y) + i''(x,y) \cos[(2\pi/d)(x + h(x,y) \tan \theta)]$$

$$i_2(x,y) = i'(x,y) + i''(x,y) \sin[(2\pi/d)(x + h(x,y) \tan \theta]\tag{9}$$

$$i_3(x,y) = i'(x,y) - i''(x,y) \cos[(2\pi/d)(x + h(x,y) \tan \theta]$$

$$i_4(x,y) = i'(x,y) - i''(x,y) \sin[(2\pi/d)(x + h(x,y) \tan \theta)].$$

Combining these equations and solving for h(x,y) gives the result $$h(x,y) = (d/2\pi \tan\Theta)\tan^{-1}\left[\frac{i_2(x,y) - i_4(x,y)}{i_1(x,y) - i_3(x,y)}\right] - x/\tan\Theta. \tag{10}$$

The last term in this equation is a linear tilt which corresponds to the projected uniform fringe pattern. This term is automatically removed by the Moire process or the aliasing that occurs with the solid-state sensor. Neither of these effects are included in this equation, but the term can be safety ignored. The term disappears when the reference grating is subtracted from the viewed fringe pattern. Noting also that d/tan $\theta$ is equal to the contour interval C, this equation can be rewritten as $$h(x,y) = (C/2\pi)\tan^{-1}\left[\frac{i_2(x,y) - i_4(x,y)}{i_1(x,y) - i_3(x,y)}\right]. \tag{11}$$

This last equation is evaluated at every point on the surface to yield a map of the surface height. If the signs of the numerator and denominator of equation (11) are determined, the arctangent can be calculated over a range of $2\pi$. The result of equation (11) is therefore to assign a surface height to each sample that is a number between zero and C, the contour interval.

The next step in the analysis for Moire topography leads to its limitation. The result of the arctangent in equation (11) is to give the surface height modulo C. FIG. 6 is a plot of an actual surface profile 62 and the surface profile modulo C 64 as would result from the above calculation. In order for the data to be useful, the discontinuities resulting from the arctangent must be removed from the calculated profile 64. In other words, the calculated surface height 64 returns to a value of zero every time the actual surface height 62 equals a multiple of C, and this segmented or "compressed" surface must be resembled to obtain the correct result. The procedure that is used in Moire topography to remove these discontinuities is to start at a single sample of the surface contour, normally at the center of the surface, and to assume that the height change between any two samples is always less than C/2. If the surface height difference calculated for two adjacent samples exceeds C/2, then C is added to or subtracted from the value of the second sample until the above condition is met. The entire surface is then reconstructed by working outward in this manner for the starting sample. FIG. 7 illustrates this process, where the original calculated surface height 66 is indicated by crosses, and the reconstructed values 68 are noted by circles. A dashed line has been drawn through the reconstructed values.

As was noted above, for a proper reconstruction, the surface height must change by less than C/2 per sample. This method of measurement therefore places a restriction on the types of surfaces that can be correctly measured. The slope of the surface must be less than C/2 per sample, and only surfaces that have small departures from a flat can be tested. For highly curved surfaces, the surface height changes too rapidly for the reconstruction algorithm to keep up with it. Because of the arctangent, this constraint in reconstruction is often referred to as the $2\pi$ ambiguity problem.

Attempts by others to overcome this limitation have basically fallen into two categories. First, the number of samples can be increased to widen the Moire intervals, or second, the projected fringe frequency can be decreased to increase the contour level. However, since the resolution of these systems is a fraction of a contour interval, often between C/100 and C/1000, this latter change will also decrease the absolute resolution of the system. The resolution of these systems is signal-to-noise ratio dependent and is dictated by the errors in the arctangent calculation. Contributing factors include the number of bits in the digital computations and sensor noise.

Another detection scheme used in Moire topography is called spatial synchronous detection or spatial heterodyne. According to this technique, the viewed fringe pattern is recorded and digitized at high spatial resolution, and the reference grid is generated in the computer. The two patterns are then multiplied, and the samples of the Moire fringes are produced in the computer. The computer-generated grid can also be shifted to yield a phase-shifting technique similar to what has been described. The trade-off between this technique and the temporal phase-shifting approach is that more pixels are needed in the sensor. An advantage is that only one record of the test pattern is needed. The spatial heterodyne technique does not require a mechanism to shift the phase of a reference grating and is immune to temporal variations such as vibration. Range limitations, analogous to those described above, exist for the spatial heterodyne technique. Spatial heterodyne Moire topography is analogous to the phase-shifting technique, where all the information is sensed at once, and the samples of the Moire pattern are generated in a computer.

Accordingly, it is the object of the present invention to extend the useful range of Moire contouring past the Nyquist frequency limit of conventional Moire contouring without increasing the number of samples of the Moire pattern and/or without increasing the projected fringe frequency.

DISCLOSURE OF THE INVENTION

The condition of Moire topography that requires a surface to have no slopes greater than a half contour interval per sample of the Moire pattern in order to be properly measured has become an accepted standard for these techniques. As will be demonstrated, this limit is not fundamental and is readily overcome by making simple and realistic assumptions about the surface under test.

As shown in FIG. 5c, steeply curved surfaces lead to the overlap of several of the sidelobes of the viewed fringe pattern spectrum in the baseband of the sensor. One property of the viewed intensity pattern is that at any location in the field, the pattern can be described by a single local spatial frequency, or at most by a very narrow range of frequencies. Therefore, at any particular sample location, a single spatial frequency $\xi_m$ is measured. Because of the overlap, this frequency may also be associated with other spatial frequencies in the overlapping sidelobes. The correct fringe frequency $\xi_o$ that corresponds to the actual surface contour is one of the solutions to $$\xi_o = |\xi_m \pm 2nf_N|, \quad n=0, 1, 2 \ldots \quad (12)$$

The accepted analysis assumes that n=0. According to the present invention, previously known information about the surface is used to resolve this frequency ambiguity problem without necessarily restricting n to equal zero.

The name given to this new technique for analyzing Moire patterns based upon a priori knowledge is Extended-Range Moire Topography. According to the present invention, method and apparatus for Moire contouring are provided whereby a test pattern of lines formed having distortions representing the contour of a surface to be measured. Samples are formed of a Moire pattern representing the product of the test pattern and an undistorted reference pattern. The samples represent the height of the surface contour modulo C, where C is a function of the spacing of the lines of the test pattern. The actual contour is reconstructed from the samples by adding or subtracting multiples of C. A constraint based upon a priori knowledge of the surface contour is applied to the reconstruction to correctly reconstruct the contour when the contour changes by more than C/2 per sample. In one example of the present invention, the a priori knowledge is that the surface contour is smooth, therefore having continuous derivatives, and the location of a neighborhood on the surface where the contour changes by less than C/2 per sample. In another example, the a priori knowledge of the surface is the location and height of a step discontinuity to within less than C.

MODES OF CARRYING OUT THE INVENTION

Figure 2:
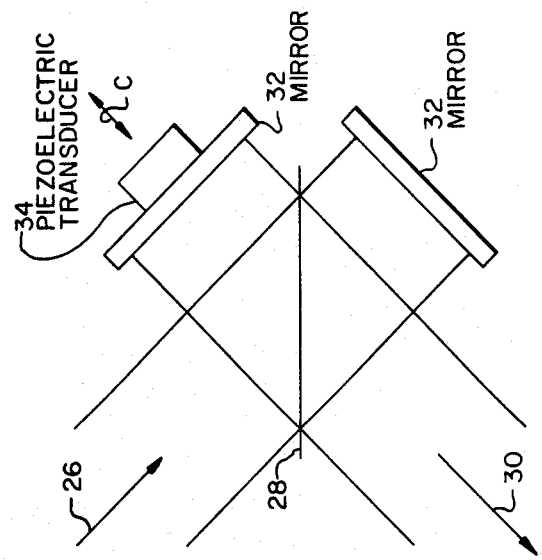
FIG. 2 is a schematic diagram illustrating an alternative method for generating a line pattern.

Two modes of carrying out the present invention will be described, one for smooth surfaces, and one for surfaces having step discontinuities. Although the modes will be described with more particular reference to phase-shifting Moire topography, it will be readily apparent that the present invention may be applied to other forms of Moire contouring, such as heterodyne Moire topography, and Moire deflectometry.

Smooth Surfaces

As explained above, the results of the phase-shifting analysis does not give the absolute height profile, but rather the relative height modulo C. The actual surface is reconstructed if the proper number of C's are added to each sample of the Moire pattern.

The assumption used by conventional Moire topography to remove the discontinuities is that the surface is continuous—it does not change by any more than a half fringe or C/2 per sample. According to the present invention, information is recovered from fringes not satisfying this condition by assuming that the surface under test is also smooth. Therefore, in addition to being continuous, the surface also has continuous derivatives.

The procedure for testing the surface begins with the standard Moire topography technique, including applying the surface continuity constraint, to obtain a first estimate of the actual contour of the surface. This result is then placed under the additional constraint that the slope of the surface cannot change by more than C/2 per sample per sample of the Moire pattern. The appropriate number of C's are added to each sample to satisfy this condition, and there is only a single solution which produces this result. The first derivative continuity constraint places a limit on the maximum allowable second derivative of the surface. However, this result is further corrected by requiring that the second derivative of the surface is also continuous, and adding more C's—the third derivative is now limited to variations of C/2 per sample per sample per sample. This procedure can be continued to higher order derivatives until a more fundamental limit, as described below, is reached.

There is one other restriction on the surface that is needed to implement this technique for smooth surfaces. In order to calculate initial values of the various surface derivatives, there must be a small block of samples where the height of the surface changes by less than C/2 per sample. A block of 2 by 2 samples is needed to implement a first-derivative continuity, a 3 by 3 block is needed for second-derivative continuity, etc. Actually, this condition is slightly overstated. All that is actually required for the $n^{th}$ derivative continuity reconstruction is a block of n+1 by n+1 samples that are correctly reconstructed by the previous order reconstruction. A correct initial value of the particular derivative must be available for the reconstruction. This block of initial samples is automatically identified by the computer, or an operator identifies their location, and inputs the location into the computer via keyboard 37, see FIG. 1.

Figure 4:
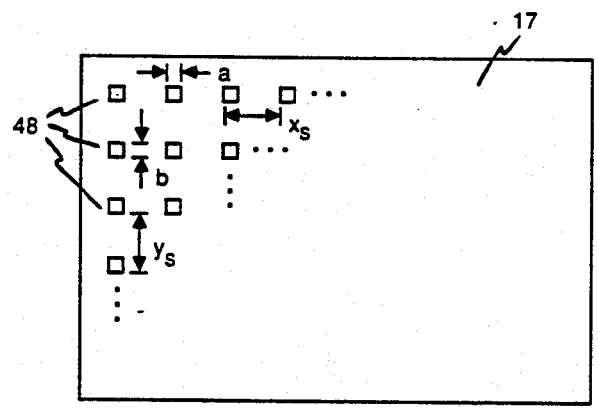
FIG. 4 is a schematic diagram illustrating a sparse image sensing array according to the present invention.
Figure 5A:
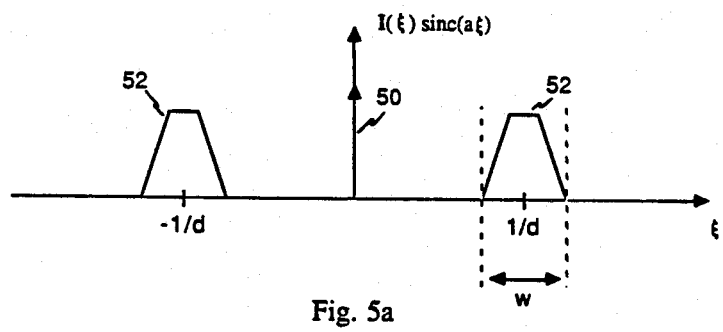
FIGS. 5a-c are frequency space diagrams useful in describing Moire topography.
Figure 5B:
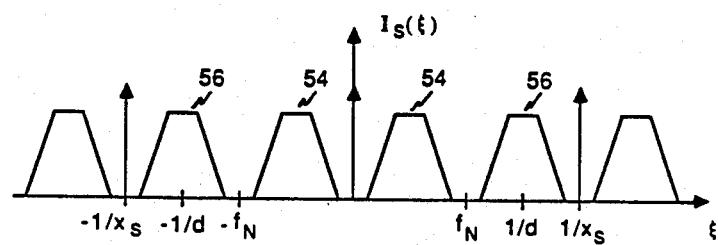
Figure 5C:
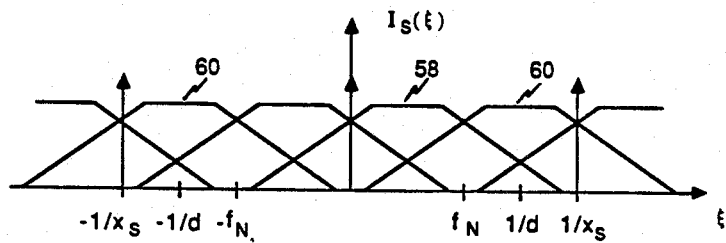
Figure 8:
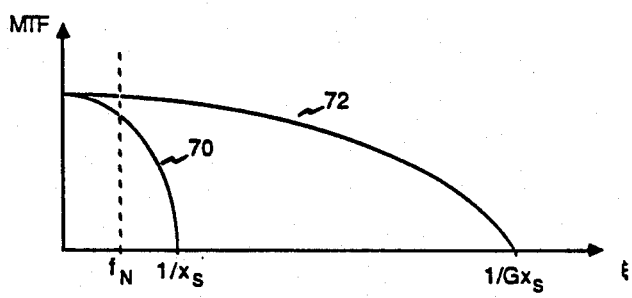
FIG. 8 is a graph of MTF vs. sampling frequency useful in describing the operation of the present invention.

The image sensor used to record the viewed fringe pattern that is preferable for implementing the extended-range Moire topography for smooth surfaces is one that is appropriate for imaging spatial frequencies that are well above the Nyquist frequency of the image sensor. The sensor must be prone to alias. As indicated in equation (5), the size of the active area of each pixel relative to the pixel pitch determines the response of the pixel to a particular spatial frequency input—the pixel MTF. If quantity G is defined as $$G = a/x_s, \qquad (13)$$

or the ratio of the pixel width to the pixel pitch, the MTF of an individual pixel will be a sinc function (of the form $\sin(x)/x$ with its first zero at a spatial frequency equal to the sensor sampling frequency divided by G, $1/(Gx_s)$. Uniform response across the pixel is assumed, and different values of G are possible in the x and y directions. To have the pixel cutoff frequency well beyond the Nyquist frequency, small values of G are needed. A small value of G implies that the pixels 48 on the sensor 17 (see FIG. 4) are small and widely separated. This is referred to herein as a sparse array. Most conventional sensors are designed for pictorial sensing and to capture as much light as possible, and therefore they have values of G generally between 0.5 and 1. The pixels on these sensors are almost contiguous. A comparison of the pixel MTF's of a standard sensor 70 and a sparse-array sensor 72 is given in FIG. 8. For purposes of the present description, a sparse array is defined as an array where G is less than 0.5.

The pixel cutoff frequency occurs at the spatial frequency corresponding to the condition of a full viewed fringe period fitting exactly inside a pixel. At this point the sensor is blind to the input, as a lateral shift of the fringe pattern will not change the signal. This point defines the ultimate limiting range of extended-range Moire topography. The measured fringe modulation is zero, and the correct value of the surface modulo C cannot be calculated.

The derivative continuity assumptions of extended-range Moire topography allow the surface to be reconstructed from aliased fringes out to a spatial frequency equal to the MTF cutoff of the pixels. This limit is a factor of 2/G greater than what is obtainable by conventional Moire topography, and gives a limit to the maximum surface slope that can be tested. The power of the extended-range technique now becomes apparent. For example, a 100 by 100 element detector array with G=0.1 and extended-range processing will have the same fringe "resolution" as a 2000 by 2000 element array processed with conventional Moire topography, but only the data from a 100 by 100 element array must be collected and processed. This example yields a savings of 400 or $(2/G)^2$ in data rates, memory and computations.

It is not possible to predict the maximum surface height that can be measured with an instrument from the maximum surface slope or fringe frequency that it can resolve. However, a factor of 2 change in measurable slope should result in a much larger increase in the measurement range. The amount of curvature that can be measured by the technique of the present invention is much more than a factor of 2/G greater than the measurement range of the standard technique for a detector with the same number of elements.

It is possible, through the application of extended-range Moire topography, to extend the measurement range of existing topography systems. Since the G values of conventional sensors are usually between 0.5 and 1, an improvement of 2 to 4 in measurable surface curvature is possible through the method of the present invention, without changing the hardware of the conventional topography apparatus.

Figure 6:
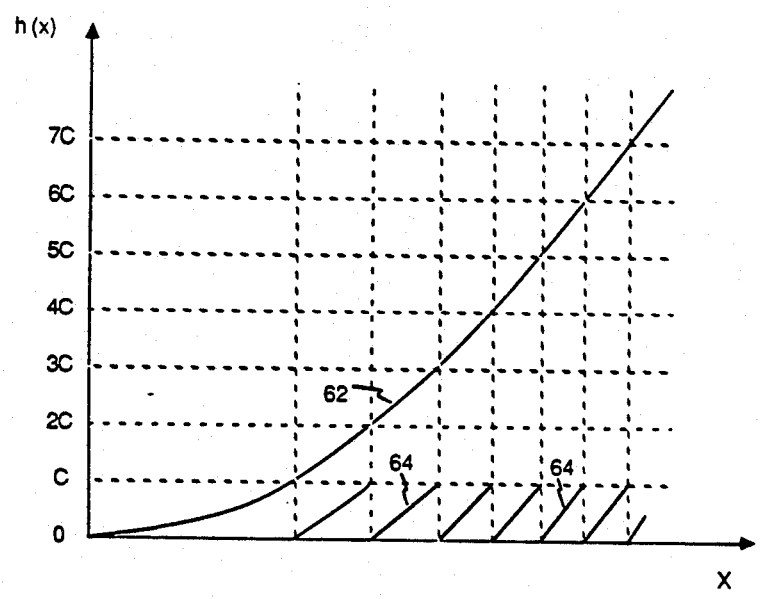
FIG. 6 is a diagram illustrating an actual surface contour, and the surface contour modulo C.
Figure 7:
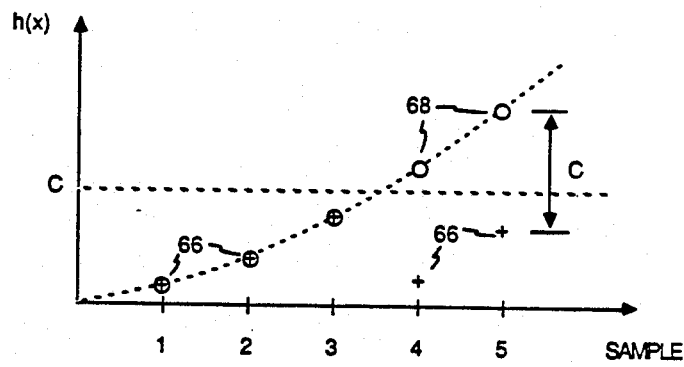
FIG. 7 is a diagram showing the reconstruction of an actual contour from a contour modulo C.
Figure 9A:
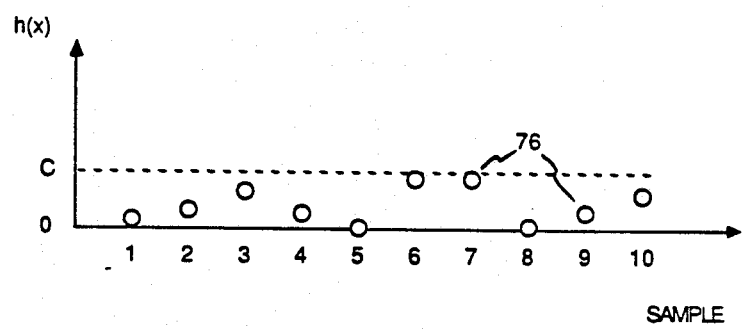
FIGS. 9a-d are graphs of sample values useful in describing the operation of the present invention.
Figure 9B:
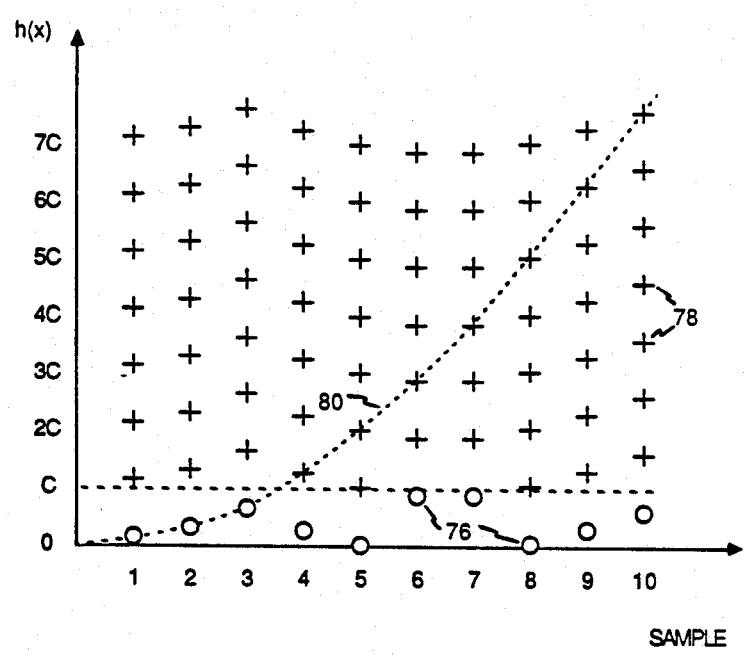
Figure 9C:
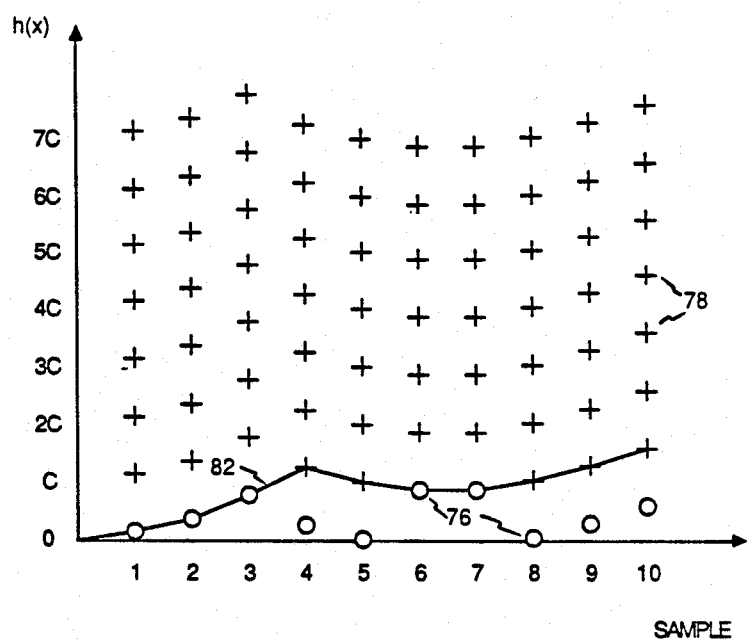
Figure 9D:
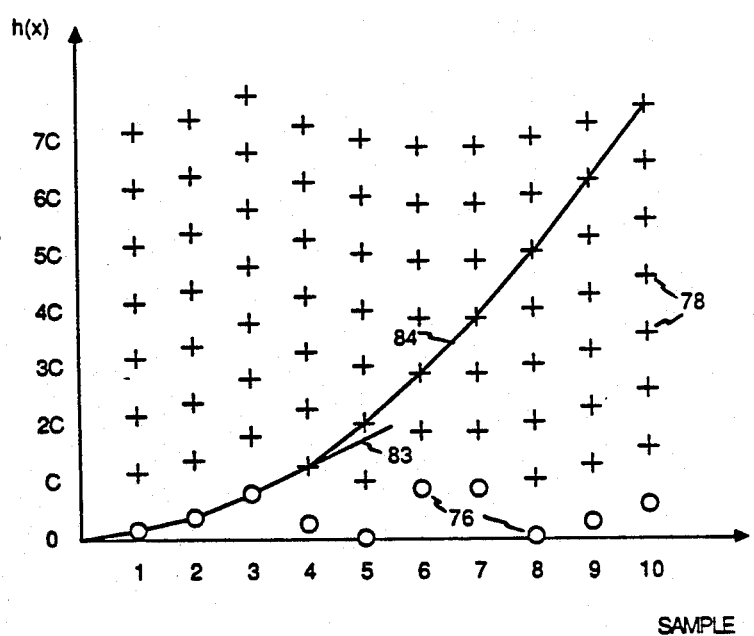

A more intuitive understanding of the extended-range technique according to the present invention can be obtained by looking at the process graphically. The data that is generated by the phase-shifting operation was shown as the compressed surface 64 in FIG. 6. Of course, this data only exists at the sample locations as shown by the sample values 76 plotted in FIG. 9a. The result of the measurement however, gives a very precise measure of the height of the contour modulo C at each sample location. The actual height will therefore be one of the solutions to $$h_i = \widetilde{h}_i \pm n_i C \qquad (14)$$

where i indexes the samples, $\widetilde{h}_i$ is the correct height, $h_i$ is the measured height modulo C, and $n_i$ is an integer. All of these possible solutions are plotted as points 78 in FIG. 9b. The dotted line 80 represents the original surface used to generate the data. The surface reconstruction problem can be thought of as a "connect-the-dots" puzzle where there are many extra dots. The conventional reconstruction technique moves from sample to sample and selects the dot that is closest to the preceding dot. It fails, of course, when the correct dot is not the closest dot, i.e. when the surface changes by more than C/2 per sample. This situation is shown by the line labeled 82 in FIG. 9c where the reconstruction fails after sample 4. The first derivative continuity constraint according to the present invention chooses the dot which lies most closely to a line 83 (see FIG. 9d) connecting the previous two dots. The correctly reconstructed surface is shown by the line labeled 84 in FIG. 9d. The reconstruction will fail when there actually is such a large change of the surface between samples that the first derivatives change by more than C/2 per sample per sample. Similarly, higher order constraints chose the next dot by extropolating a curve that has been fit through the appropriate number of preceding dots.

As noted previously, the sensor that is preferred for extended-range Moire topography is one that has a sparse array of image sensing elements. The most straight-forward way to obtain such a sensor is to fabricate it. A photolithographically applied aluminum or opaque mask, which defines the pixel apertures, may be applied over a standard solid-state sensor to achieve a sensor with a small value of G. Furthermore, an existing sensor with a high G value may also be employed. By using every $n^{th}$ sample produced by such a sensor, an effectively low value of G is obtained.

Figure 1:
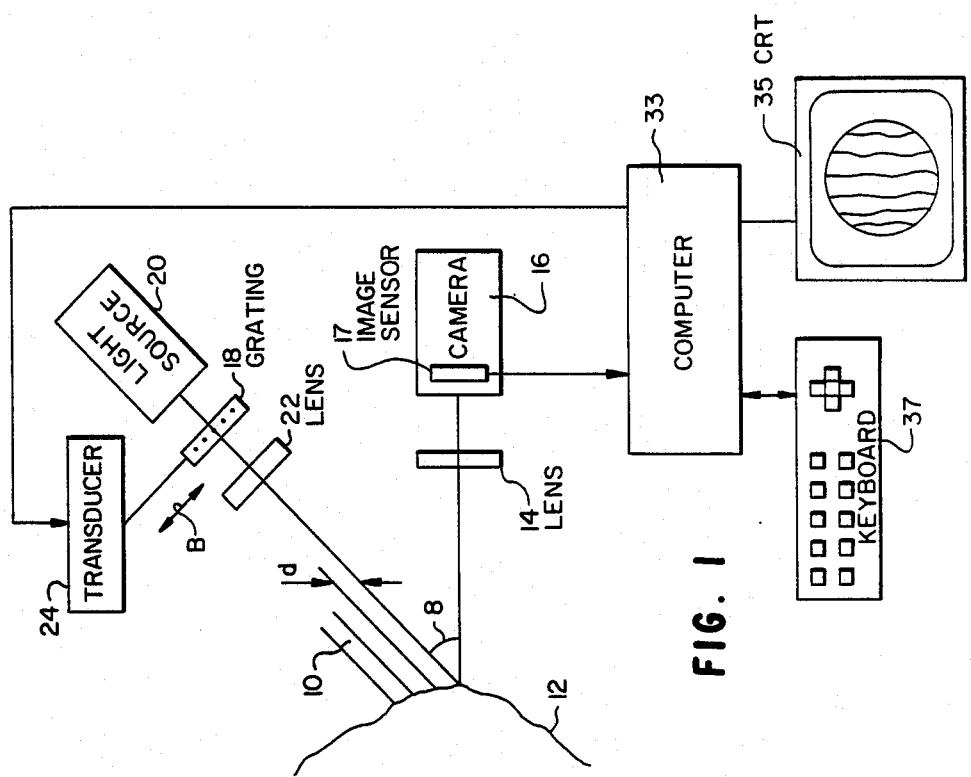
FIG. 1 is a schematic diagram of Moire topography apparatus useful with the present invention.
Figure 3:
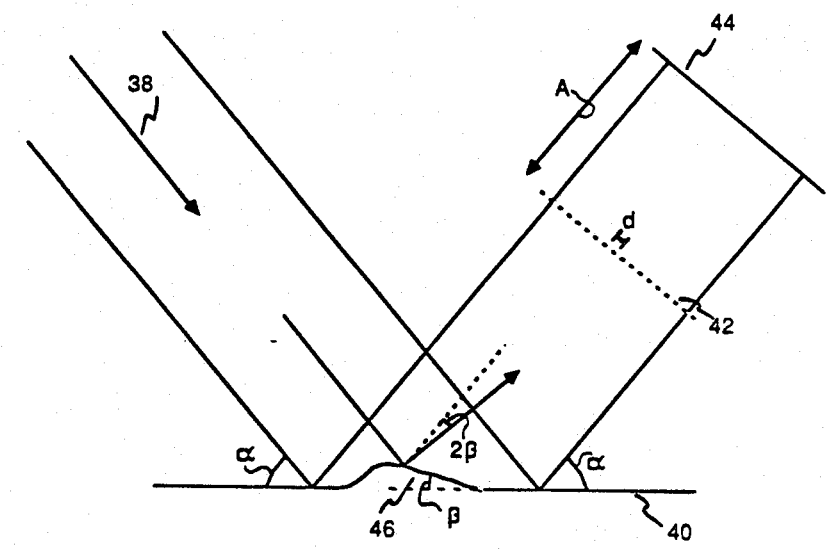
FIG. 3 is a schematic diagram useful in describing Moire deflectometry for a specularly reflecting surface.

As shown in FIG. 1, the computer 33 receives the image from the solid-state sensor 17 and also provides the signal to control the motion of the projecting grating 18 or an interferometer mirror 32 (see FIG. 2) to implement the phase-shifting algorithm. The reconstruction of the surface contour of the object is shown on the display 35. The computer 33 can also be programmed to compare the measured height profile to a particular design specification stored in the computer 33 to produce a pass/fail message on display 35.

For implementation of extended-range Moire topography according to the present invention, an initial block of samples needed for the starting point of the reconstruction process must be identified prior to the start of the reconstruction. This location is chosen manually by the operator by displaying the Moire pattern on the display 35, locating an area in the image of the Moire pattern that has uniform high contrast fringes and inputting the coordinates to the computer 33 via keyboard 37. Information about the design of a test part can also be used to select the starting location within a flat zone on the part. This information may be supplied to the computer from a CAD/CAM system. Automatic identification of a starting location is also possible. For a static fringe pattern, the sparse-array sensor can be used to scan out the viewed fringe pattern at high resolution by repeated small translations of the image sensor. The size of the translations should be on the order of the size of the pixel aperture. An area in the pattern where the fringe frequency is in the first Moire interval is chosen as the starting location.

Figure 10A:
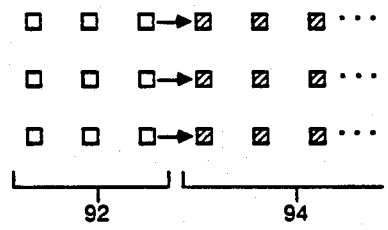
FIGS. 10a and b are diagrams illustrating the procedure for reconstructing a two-dimensional contour having continuous derivatives.
Figure 10B:
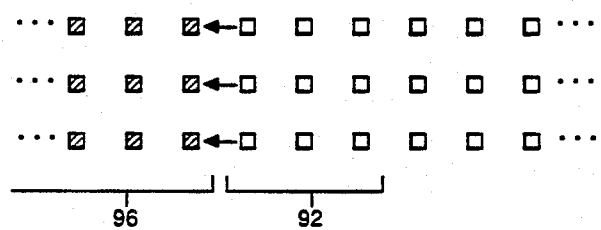

When two-dimensional data sets are used, the reconstruction moves outward from the starting location. An example of a method to accomplish this process is diagramed in FIGS. 10a and b for a starting block 92 of 3 by 3 samples and a second derivative continuity constraint being applied to the reconstruction. The three rows of starting samples are first expanded one row at a time to the right by the method described below (FIG. 12a) to reconstruct three rows of samples 94. Using a similar procedure, these three rows are expanded to the left to produce the reconstructed samples 96 in FIG. 10b. At this point, three rows of samples across the surface are completely reconstructed. Three properly reconstructed samples now exist in every column of samples, and these columns can be individually reconstructed up and down by an operation that is the same as the method used for the rows. It should be clear that other strategies exist for reconstruction of the two-dimensional data set.

Figure 11:
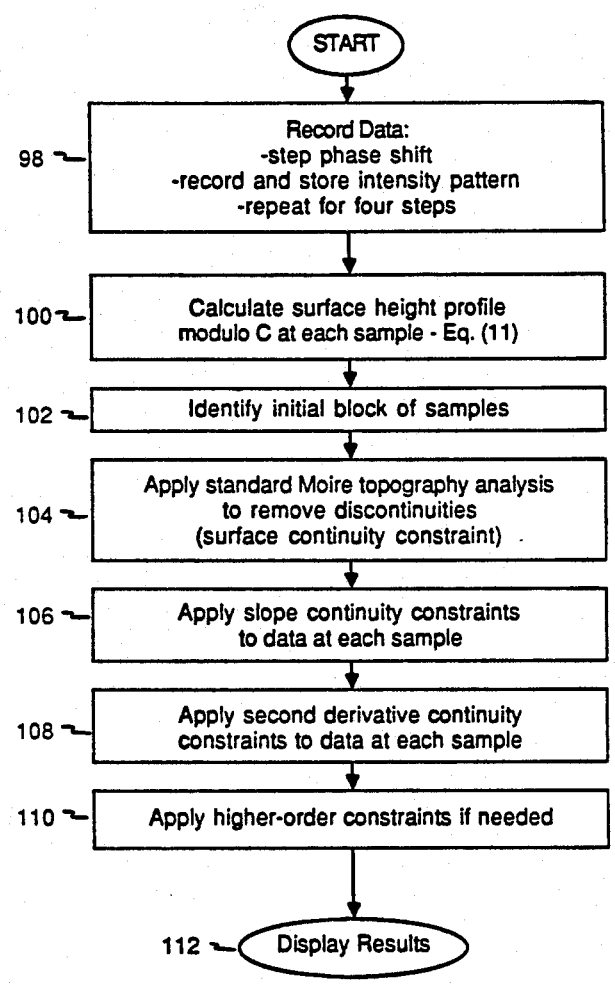
FIG. 11 is a flow chart showing the steps of reconstructing a surface contour according to the present invention.

The computer steps needed to implement extended-range Moire topography according to the invention are diagramed in FIG. 11. In the first step 98, the four measurements of the viewed fringe pattern are made with different phase shifts as noted in equation (9). At the next step 100, the height of the surface modulo C is calculated as in equation (11). The block of initial samples to be used for the reconstruction is then identified (step 102). At step 104, the height discontinuities are removed by limiting the height different between samples to a maximum of C/2. The reconstruction to this point is the same as that produced by the prior art procedure for Moire topography. Next, the surface constraints appropriate for extended-range Moire topography are applied. The slope continuity constraint is applied first, step 106, followed by the second derivative continuity constraint, step 108. Higher order continuity constraints can also be applied, (step 110), but simulations have indicated that it is probably not necessary to implement any constraint higher than second derivative continuity for a sensor with a G value of about 0.1. The MTF cutoff of the pixel aperture is reached before this constraint fails to properly reconstruct a surface contour. For sensors with lower values of the pixel width-to-pitch ratio G, higher order constraints may provide improved performance. The final step, 112, is to display the results.

Appendix A is a computer program written in the BASIC language for implementing a first-derivative or slope continuity constraint to a line of samples. The samples are indexed by N from 0 to Ntotal line 2, HEIGHT(N) line 3 is the calculated surface height and is initialized with the values resulting from the standard Moire topography analysis (step 104 in FIG. 11), and SLOPE(N) is the calculated surface slope. Note that the first sample to be tested is N=2, or the third sample. Two initial samples are needed to start the process. Line 4 tests to see if a slope change of more than C/2 per sample per sample has occurred. If not, that sample remains unchanged, and the next sample is tested. If a positive change in slope has been detected (Line 5), C is subtracted from the tested sample and all subsequent samples (Line 8). This new value of HEIGHT(N) is retested at Line 4, and the process is repeated, if necessary. Similarly, C is added to the sample if a large negative slope change is detected (lines 11-13). The values of HEIGHT(N) that result from this program will have no large slope changes. The fact that the program can be written in 15 lines of code indicates the ease with which this process can be implemented. Analagous steps are used to implement the second and higher-order derivative continuity constraints (steps 108, 110 in FIG. 11).

The extended-range procedure will fail when the actual surface exceeds the various limits that have been assumed for the derivatives. Fortunately, since the conditions of failure are known, it is possible to predict the point at which the reconstruction becomes invalid. For example, when the derivative continuity conditions are used, the local values of the slope and higher-order derivatives are calculated at each sample. As the calculated values approach the limits in the assumptions, C/2 per pixel, etc., the reconstruction is stopped, and a higher-order constraint applied to the data. The calculated value of the slope is used to determine where the fringe frequency, which is related to the slope, reaches the resolution limit of the system—the pixel MTF cutoff frequency.

The point at which the viewed fringe frequency reaches the cutoff frequency of the pixel MTF can also be determined by another method. Up to this point, the analysis has shown that data from fringes out to this pixel MTF cutoff frequency can be analyzed. In practice, there will be some limiting or threshold MTF below which there will be insufficient modulation of the recorded fringe pattern to provide reliable estimates of the surface height. The data modulation at each sample can be monitored, and any samples failing to meet some established criteria can be discarded.

Other a priori information about the surface can be used to resolve the surface height ambiguities. Alternative to or in addition to the surface smoothness assumptions, it is possible to use knowledge of the design of a surface having step discontinuities and abrupt slope changes to remove the ambiguities, if it is known that the design goals are being met. For surfaces that are known to have abrupt slope changes, the location of the change alone may be used to constrain the reconstruction.

Discontinuous Surfaces

Moire topography has not generally been considered a useful technique for measuring surfaces that have discontinuities or steps larger than half a contour interval or C/2 in height. This is especially true for high-accuracy measurements since, for a particular instrument, C also defines the system resolution. Resolutions on the order of C/100 to C/1000 are commonly achieved. More useful techniques have been mechanical profilometry or structured lighting using a single line of illumination. The use of a priori information according to the present invention makes Moire topography techniques useful for measuring step discontinuities.

Figure 12:
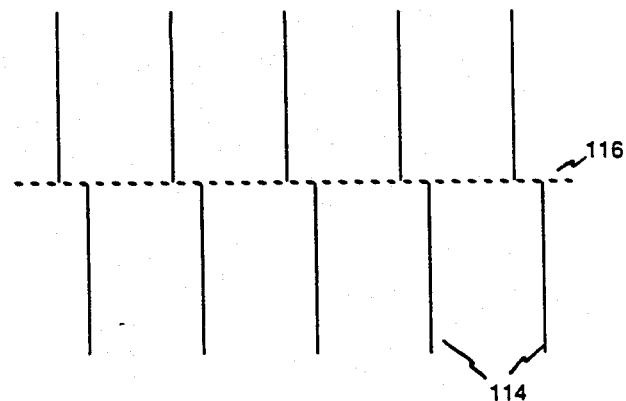
FIG. 12 is a diagram illustrating a Moire pattern produced at a step discontinuity in a surface.

A Moire fringe pattern 114 for a surface contour having a step 116 running in the horizontal direction is shown in FIG. 12. The standard Moire topography measurement gives the step height as a number between plus or minus a half contour interval, and the actual step height h is $$h = h_o + nC \qquad (15)$$

where $h_o$ is the measured height, and n is an integer. In FIG. 12, the fringe pattern is shifted by approximately a quarter fringe as would be seen when $h_o$ equals C/4.

Figure 13:
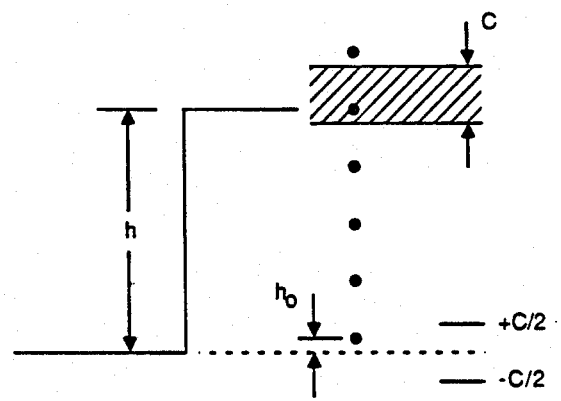
FIG. 13 is a diagram useful in describing the application of the present invention to a step discontinuity.

Information about the step height that has been obtained by another measurement technique, or another source, can be used to resolve the ambiguity in equation (15). This other information must give the height to within less than one contour interval C. The application of this a priori information selects a single value of n, and results in an accurate measurement of the step height. This situation is diagramed in FIG. 13 for a step h. The step height modulo C ($h_o$) is calculated as a number between −C/2 and C/2, and the other possible solutions indicated by the points in FIG. 13 are separated by C. The a priori information provides a zone, indicated by cross hatching, of a width C into which only one of these solutions will fall.

As noted above, information that can be used to determine a step height to within less than C may be the part design or parameters describing the manufacturing process. For example, consider a part that has a 25 mm step whose height must be known to within ±0.005 mm. Conventional Moire topography will be unable to perform this measurement as the chosen contour interval would need to be greater than 50 mm, and the instrument would need to have a resolution of 0.01 mm or C/5000. This is an impractical resolution to achieve using conventional techniques. However, if a manufacturing process is used which will produce a step whose height is known to be 25 mm±0.1 mm, an extended-range topography system according to the present invention can be easily built. This manufacturing tolerance is the total range into which all parts will fall. The standard deviation of the process can be significantly less. A contour interval greater than 0.2 mm, for example 0.4 mm, is chosen, and the required measurement resolution of 0.01 mm is then C/40, which is easily obtained. The manufacturing tolerance has been used to define the contour interval, not the step height. The system operates by first measuring the surface height with a standard Moire topography technique. This answer will be in the range −C/2 to C/2 (±0.2 mm). The appropriate number of C's (0.4 mm) are added to this answer until a number between 24.9 mm and 25.1 mm, the manufacturing tolerance, is reached.

Unlike the case for continuous surfaces, no special sensor configuration is needed to implement extended-range Moire topography on discontinuous surfaces. The power of this technique for this application is that large steps are measured with much smaller contour intervals, while maintaining the resolution inherent to small contour intervals. the only requirements for implementing this technique is that the step height is known a priori to a precision less than one contour interval.

Figure 14:
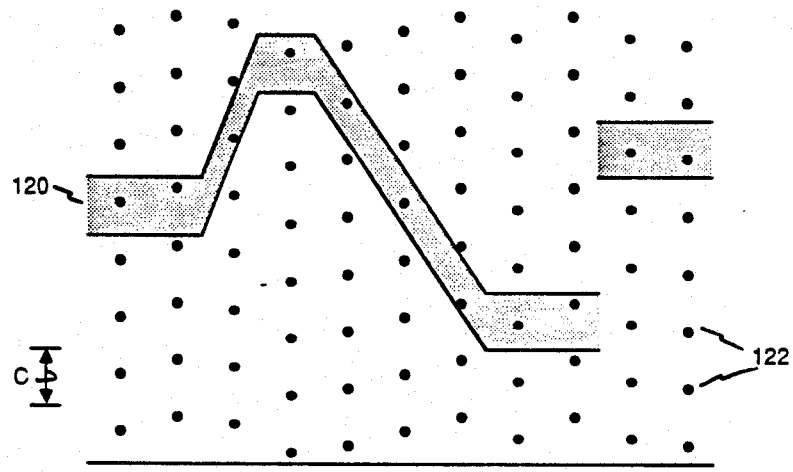
FIG. 14 is a diagram illustrating the application of the invention to a surface of a known design and known manufacturing tolerances.

In a similar manner, the design of the surface can be used in conjunction with known manufacturing tolerances to reconstruct the surface profile of a part that does not comply with the surface derivative continuity constraints. This is illustrated in FIG. 14 in one dimension, where the shaded area 120 represents the total range over which all manufactured parts will fall. It is the part design with a zone to represent the known manufacturing tolerances. This range must be less than a contour interval C wide. It is exactly analogous to the step height range used to determine large step heights. The columns of dots 122 are all of the possible solutions to the surface height at each sample, as in equation (15), and only one of the dots in each column will fall into the shaded zone 120. These points represent the reconstruction of the surface at the lateral resolution of the samples. The precision of the height measurement is the same as discussed earlier. Changes in surface height of more than C/2 per sample are allowed by this technique. It is important to note also that if some segment or portion of the surface is curved, that segment can be reconstructed by use of the surface derivative continuity constraints. Each segment can be handled independently, and different a priori knowledge can be applied to each.

INDUSTRIAL APPLICABILITY AND ADVANTAGES

Extended-range Moire contouring according to the present invention is useful in the industrial field of surface contour measurement known as Machine Vision. The extended-range Moire contouring technique is based upon the use of a priori knowledge about the surface to constrain the reconstruction of the surface contour. Very simple and reasonable assumptions, such as the continuity of the various surface derivatives, have been shown to yield dramatic increases in the measurement range of the instrument. These new assumptions allow much more information to be extracted from the data than by previously available techniques. The advantage that the extended-range technique presents is its ability to measure large amounts of surface curvature without resorting to extremely large detector arrays. The savings is not just in the size of the array, but also in the data rates, the amount of computer memory and the number of needed computations. The application of the technique to discontinuous surfaces provides for a large measurement range with high precision.

As mentioned earlier, the data analysis described is equally well applied to the application of Moire deflectometry. In this case, what is measured is the slope of the surface under test, so that the conventional technique applies what is really a slope continuity condition to the surface. The extended technique requires that the higher-order derivatives are also continuous. Once a map of the surface slope is obtained, the original surface can be deduced. The extension of the technique to procedures other than phase-shifting Moire contouring, such as heterodyne Moire contouring will be immediately apparent to those skilled in the art.

APPENDIX A

```
1  SLOPE(1)=HEIGHT(1)-HEIGHT(0)
2  FOR N=2 to Ntotal
3  SLOPE(N)=HEIGHT(N)-HEIGHT(N-1)
4  IF ABS(SLOPE(N)-SLOPE(N-1))≦C/2, GO TO 15
5  IF (SLOPE(N)-SLOPE(N-1))>0, GO TO 7
6  GO TO 11
7  FOR L=N to Ntotal
8  HEIGHT(L)=HEIGHT(L)-C
9  NEXT L
10 GO TO 3
11 FOR L=N to Ntotal
12 HEIGHT(L)=HEIGHT(L)+C
13 NEXT L
14 GO TO 3
15 NEXT N
```

I claim:

1. A method of Moire contouring comprising the steps of:
   a. forming a test pattern of spaced lines having distortions representing a contour of a test surface;
   b. forming samples of a Moire pattern representing a product of said test pattern and a reference pattern, representing a reference surface;
   c. calculating from said Moire pattern samples, height difference samples representing the difference in height of the test surface and the reference surface said height difference samples being expressed in modulo C, where C is a linear dimension which is a function of the spacing of lines of the test pattern and where said height difference samples can differ by more than C/2 between adjacent samples;
   d. reconstructing the surface contour from said height difference samples by adjusting said height difference samples by multiples of C, including the step of applying a constraint based on a priori knowledge of the test surface to correctly reconstruct the surface contour when the height difference samples change by more than C/2 per sample.

2. The method claimed in claim 1, wherein said a priori knowledge of the surface is: (1) that the test surface is smooth, therefore, the test surface contour being represented by a function having continuous derivatives, and (2) a location of a neighborhood on the test surface where the height difference between the test surface and the reference surface changes by less than C/2 per sample.

3. The method claimed in claim 2, wherein said samples having width and pitch are formed from a sparse array of sampling locations defined by a parameter G being less than 0.5, where $G=a/x_s$, a is the width of a sample, and $x_s$ is the pitch of samples in the array.

4. The method claimed in claim 3, wherein G=0.1.

5. The method claimed in claim 1, wherein said a priori knowledge of the test surface further includes the location and height of a step discontinuity to within less than C.

6. The method claimed in claim 1, wherein said a priori knowledge of the surface comprises design specifications and manufacturing tolerances.

7. The method claimed in claim 1, wherein said Moire contouring method is Moire topography, said test pattern being formed by projecting a grid pattern having a period d onto the surface of a diffusely reflecting object, the samples of said Moire pattern being formed by viewing said surface with an image sensor having an array of image sensing elements along a viewing axis at an angle $\theta$ from a direction of projection of said grid pattern, and $$C=d/\tan\theta.$$

8. The method claimed in claim 7, wherein said Moire topography method is phase-shifting Moire topography.

9. The method claimed in claim 8, wherein said test pattern is formed by projecting an image of a grid.

10. The method claimed in claim 8, wherein said test pattern is formed by projecting an interference pattern.

11. The method claimed in claim 1, wherein said Moire contouring method is Moire deflectometry, said test pattern being formed by reflecting a beam of collimated light from the surface of a specularly reflecting object and modulating the reflected beam with a grating having a pitch d, the samples of said Moire pattern being formed by an image sensor having an array of image sensing elements located a distance A from the grating, and $$C=d/2A.$$

12. Moire contouring apparatus comprising:
   a. means for forming a test pattern of spaced lines having distortion representing a contour of a test surface;
   b. means responsive to an image of said test pattern for generating a first signal representing samples of a Moire pattern formed by a product of said test pattern and a reference pattern representing a reference surface;
   c. computer means for;
      1. calculating from said Moire pattern samples, height difference samples representing the difference in height between the test surface and the reference surface, said height difference samples being expressed modulo C, where C is a function of the spacing of lines in said test pattern and where said height difference samples can differ by more than C/2 between adjacent samples;
      2. receiving a second signal representing a priori knowledge of the contour of the test surface, and responsive to said first and second signals for generating a third signal representing samples of the actual height difference between said test surface and said reference surface, by adjusting said height difference samples by multiples of C such that the height difference is correctly reconstructed when the height difference changes by more than C/2 per sample.

13. The apparatus claimed in claim 12, wherein said a priori knowledge of the test surface is: (1) that the test surface is smooth, such that the test surface can be represented by a function having continuous derivatives, and (2) a location of a neighborhood on the test surface where the height difference between the test surface and the reference surface changes by less than C/2 per sample; and further including display means for displaying an image of the Moire pattern, and operator controlled input means for an operator to input the coordinates of said location of a neighborhood on the test surface.

14. The apparatus claimed in claim 13, wherein said means for generating said first signal comprises a sparse array of image sensing elements having width and pitch and being defined by a parameter G being less than 0.5 where:

$$G = a/x_s \text{ and}$$

a is the width of an image sensing element and $x_s$ is the pitch of elements in said array.

15. The apparatus claimed in claim 14, wherein $G = 0.1$.

16. The apparatus claimed in claim 12, wherein said Moire contouring apparatus comprises apparatus for conducting Moire topography, said means for forming a test pattern comprising means for projecting along a projection axis a fringe pattern having a period d onto a surface of a diffusely reflecting object, said means for generating said first signal comprising an image sensing array arranged to view said surface at an angle $\theta$ from the projection axis of said fringe pattern, whereby $$C = d/\tan \theta.$$

17. The apparatus claimed in claim 16, wherein said Moire topography apparatus comprises apparatus for conducting phase-shifting Moire topography, said means for generating said first signal including means for phase shifting said test pattern with respect to said reference pattern and sampling said Moire pattern three or more times, and said computer means forming said signal representing height difference modulo C from said phase-shifted samples.

18. The apparatus claimed in claim 17, wherein said means for projecting a fringe pattern comprises a light source, projection optics defining a projection axis, and a grid, said means for shifting the phase of said fringe pattern comprises means for displacing said grid in a direction perpendicular to the projection axis.

19. The apparatus claimed in claim 17, wherein said means for projecting a fringe pattern comprises a Twyman-Green interferometer having a source of a beam of collimated light, a beamsplitter and a pair of plane mirrors, and the means for shifting the phase of said fringe pattern comprises means for displacing one of said plane mirrors parallel to the collimated light beams.

20. The apparatus claimed in claim 12, wherein said Moire contouring apparatus comprises apparatus for conducting Moire deflectometry, said means for forming a test pattern comprising means for shining a beam of collimated light onto the surface of a specularly reflecting object, a grating having a pitch d for modulating a reflected beam, and an image sensor having an array of image sensing elements located a distance A from the grating, and $$C = d/2A.$$

* * * * *